ced Apr. 7, 1936

2,036,345

UNITED STATES PATENT OFFICE 2,036,345

METHOD AND MEANS FOR MAKING COFFEE INFUSIONS MORE DIGESTIBLE

Hans Merkel, Breslau, Germany

No Drawing. Application November 22, 1934, Serial No. 754,281. In Germany January 11, 1934

8 Claims. (Cl. 99—71)

The civilized man requires certain stimulants in order to animate the nerves and incite the mental and working powers after fatigue and exhaustion, such as experienced by almost everyone owing to the daily life and the struggle for existence. Coffee can be considered as the most harmless of such stimulants so that its general use is in the interests of every country. However, some people experience excitement accompanied by nervous symptoms, palpitations, insomnia and the like. Moreover, many people after drinking coffee suffer from stomachic derangements, symptomized by heaviness, heart burning and the like. In the case of persons with kidney and bladder troubles the organs themselves and the urethra are not infrequently detrimentally influenced.

It has often been proposed to overcome these objectionable symptoms by extracting the caffeine from the raw beans. However, the results hitherto obtained were not satisfying. On the one hand, the decaffeinizing processes are complicated and expensive and on the other hand, the decaffeinized beans, owing to the bursting of the cell walls, are very difficult to roast and, therefore, have a tendency to burn easily; moreover the coffee infusions made of decaffenized beans never possess the full agreeable flavor and the fine aroma of pure natural coffee. Further, experience has shown that much larger quantities of decaffeinized beans must be employed in order to obtain a strong beverage tasting similar to natural coffee.

However, the injuriousness of coffee is not due solely to the content of caffeine, but to a great part to the acids contained in the coffee and to the effect of substances which have not been sufficiently investigated, but which form chiefly during the roasting process. That the injuriousness of caffeine is considerably overestimated is proved by the fact that once a weak person in suicidal intention took relatively large quantities (about 10 grams) of pure caffeine without showing considerable symptoms of poisoning.

The object of the invention is, to overcome the discomforts experienced by many people after drinking coffee or to alleviate these discomforts to such an extent that the beverage is not objectionable from a medical point of view and can be recommended even to nervous people. This is attained, according to the invention, by adding to the water for making the infusion, to the ground coffee or to the finished infusion, acid binding substances, especially compounds having a more or less strong alkaline reaction, in such quantity that the hydrogen ion concentration of the infusion is pH 6.4 to pH 6.9. It has been asserted that, by exceeding a hydrogen ion concentration of 6.2, a beverage of disagreeable odor is obtained which under certain circumstances may even cause nausea. However, practical experiments have shown that this assertion is absolutely incorrect and that, on the contrary, a coffee infusion, adjusted to a pH value of 6.4 to 6.9, can in no way be distinguished in flavor and aroma from an untreated pure coffee infusion. The infusion after the adjustment certainly has a weak acid reaction, but the excessive detrimental acids, which are those which matter, are eliminated.

For making the coffee digestible in the manner described, all acid binding compounds which are non-injurious for human health are suitable, for example the oxides, hydroxides, carbonates and bicarbonates of the alkaline earths metals and the carbonates, bicarbonates and alkaline phosphates of the alkali metals. Alkalis, especially borax, have already been added to concentrated tea and coffee infusions in order to enable them to be stored unclouded in cold condition. Concentrated infusions thus treated have, however, no bearing on the invention as they are not intended for immediate consumption but must, if necessary, be diluted with three or four times the quantity of water. Moreover, the borax recommended for this purpose is not neutral and cumulatively very injurious to health, so that its addition to foods is forbidden by modern law.

The more strongly alkaline the compound employed is, the smaller the quantity required will be. For example, the tertiary sodium phosphate, that is trisodium phosphate, has proved particularly suitable and of which only very small quantities are required to obtain the pH value of 6.4 to 6.9. A coffee infusion of about 8 grams ground coffee beans per cup (this quantity is generally taken for a cup of good coffee) having, for example, a pH value of 5.7 without acid binding, that is alkaline admixture, is brought to a pH value of 6.4 by 0.06 to 0.07 gram of water-free trisodium phosphate.

By the above mentioned adjustment to the pH values indicated, however, not only the excessive detrimental acids are eliminated, but the caffeine is separated from its loose combinations with the same, so that its greater portion becomes free. However, it is known that pure free caffeine can be taken in much larger doses than correspond to those present in the normal coffee infusions in a form bound to the excessive detrimental acids. As above stated, 10 grams of pure caffeine was taken in one instance without producing serious poisoning symptoms.

If therefore by the extraction of the injurious excessive acids the harmful property of the caffeine is already considerably reduced, any remaining slight activity of the caffeine on the nervous system can be almost completely eliminated by a simultaneous slight addition of bromide compounds. For example, 0.1 gram of potassium bromide can be added at the same time as the alkaline salts or compounds to an infusion of 8 grams of coffee containing about 0.1 gram of caffeine. Consequently, the digestibility of the infusions is considerably increased by the addition of bromide in conjunction with the acid binding substances.

As already mentioned, all suitable acid binding substances can be employed for the purpose in question. If alkaline phosphoric salts, especially trisodium phosphate, that is the tertiary compound, is taken, in all probability by the admixture of the phosphate to the coffee beverage the formation of lipoids is initiated and then continued in the digestive organs and the remainder of the body. Substances similar to lecithin are formed in an easily digestible form, the formation being assisted by the additional nutriment, such as milk, cream and butter taken with the coffee. The trisodium phosphate, here mentioned by way of example, consequently acts, when drinking coffee, as a building up substance besides for rendering harmless the excessive acids and for liberating the caffeine, in that it supplies phosphorus to the human organs which is so necessary for the maintenance of the body.

As is known, lipoids and substances similar to lipoid possess the property of reducing the injuriousness of the caffeine, this having been proved by scientific experiments. To what chemical procedures this is due, does not appear to have as yet been fully investigated; the fact as such, however, remains.

As according to the invention bromide compounds can be added to the alkaline reacting salts or compounds, the simultaneous presence of bromide and substances similar to lecithin in the coffee beverage, when employing trisodium phosphate, initiates the formation of compounds similar to bromide lecithin, because, as is known, bromide and lecithin combine very easily. It is, however, known that bromide as a lecithin compound represents the most favorable form for an intensive feeding of nerves and the action of the individual components considerably increases by stimulating the function of the glands.

Lipoids as such can, however, be also added from the outset to the acid binding substances with or without bromide salts for rendering the caffeine still less injurious. As already mentioned, it is known that the lipoids eliminate or reduce the injurious effect of the caffeine.

As stated above, the composition of matter, as per my invention, useful for rendering coffee infusions more digestible, contains acid binding substances of basic or alkaline character which are adapted for raising the pH value of the infusion and as already mentioned it is advantageous to use such acid binding substances which in all probability favour the formation of lecithin or substances similar to lecithin in the body. In this respect I have found out that trisodium phosphate is particularly suitable to serve the purpose.

I prefer, however, a composition containing bromide compounds as for instance potassium bromide in addition to the acid binding substances. A very suitable composition contains waterfree trisodium phosphate and potassium bromide, the amount in weight of the trisodium phosphate being between 0.6 and 0.7 times that of the potassium bromide.

Other compositions of desirable qualities contain acid binding substances and lipoids, as for instance lecithin, and a preferable composition of this group contains waterfree trisodium phosphate and lecithin, the amount in weight of the trisodium phosphate being between 0.6 and 0.7 times that of the lecithin.

Further compositions as per my invention contain bromide compounds as well as lipoids besides the acid binding substances, and such a composition contains per example waterfree trisodium phosphate, potassium bromide and lecithin, in a relation of weight of between 0.6 and 0.7 to 1 to 0.5 respectively.

For convenience of use, the composition as per my invention may be ready dosed taking as a basis for instance the amount of 8 grams ground coffee beans needed, on an average, for a cup of good coffee. The dosation may be effected by making packages or what I consider as equivalent therewith, by making tablets containing the correct quantity of the composition needed for one cup or a plurality of cups of coffee, or for any desired quantity of the beverage. Under consideration of the aforegoing, a tablet or package has to contain sufficient acid binding substance to adjust the pH value of the infusion in respect to the quantity of which the tablet or package is dosed to between pH 6.4 and pH 6.9. Hence a tablet for one cup of coffee may contain between 0.06 and 0.07 gram of waterfree trisodium phosphate and 0.1 gram of potassium bromide. It is evident, however, that less or more than the dosed quantity can be used according to the strength of the infusion.

Although I have mentioned only coffee in this specification and the claims, the same process and substances may be used for rendering certain other beverages as for instance tea, more digestible and I wish to have understood my claims as to include such other beverages which may be treated by the process and composition as per the invention with a similar result as coffee.

I claim:—

1. A process for rendering coffee infusions more digestible, consisting in adjusting the pH value of the infusion to between pH 6.4 and pH 6.9 by adding to said infusion an acid binding substance selected out of the groups of basic and alkaline materials which are noninjurious to human health.

2. A tablet for rendering coffee infusions more digestible containing acid binding substances and bromide compounds, said acid binding substances in a quantity sufficient to adjust the pH value of the infusion in respect to the quantity of which the tablet is dosed, to between pH 6.4 and pH 6.9.

3. A tablet for rendering coffee infusions more digestible containing acid binding substances, bromide compounds, and lipoids, said acid binding substances in a quantity sufficient to adjust the pH value of the infusion in respect to the quantity of which the tablet is dosed, to between pH 6.4 and pH 6.9.

4. A tablet for rendering coffee infusions more digestible containing trisodium phosphate and potassium bromide, the amount of said trisodium phosphate being in weight between 0.6 and 0.7 times that of said potassium bromide, and being sufficient to adjust the pH value of the infusion in respect to the quantity of which the tablet is dosed, to between pH 6.4 and pH 6.9.

5. A process for rendering coffee infusions more digestible, consisting in adjusting the pH value of the infusion to between pH 6.4 and pH 6.9 by adding trisodium phosphate.

6. A process as specified in claim 5 in which potassium bromide and lecithin are added besides the trisodium phosphate in a weight relation of between 0.6 and 0.7 to 1 to 0.5 of the trisodium phosphate, the potassium bromide and the lecithin, respectively.

7. A tablet rendering coffee infusions more digestible containing bromide compounds and such acid binding substances which are suitable for the initiation of the formation of compounds similar to bromide lecithin from said bromide compounds and the lecithin like substances of the coffee, said acid binding substances being contained in the tablet in a quantity sufficient to adjust the pH value of the infusion in respect to the quantity of which the tablet is dosed to between pH 6.4 and pH 6.9.

8. A tablet as claimed in claim 7 which contains lipoids besides the acid binding substances and the bromide compounds.

HANS MERKEL.